(12) United States Patent
Flaig

(10) Patent No.: US 10,156,248 B2
(45) Date of Patent: Dec. 18, 2018

(54) PROFILE CONNECTOR AND PROFILE ASSEMBLY

(71) Applicant: Hartmut Flaig, Aldingen (DE)

(72) Inventor: Hartmut Flaig, Aldingen (DE)

( * ) Notice: Subject to any disclaimer, the term of this patent is extended or adjusted under 35 U.S.C. 154(b) by 89 days.

(21) Appl. No.: 15/307,471

(22) PCT Filed: Mar. 26, 2015

(86) PCT No.: PCT/EP2015/056525
§ 371 (c)(1),
(2) Date: Oct. 28, 2016

(87) PCT Pub. No.: WO2015/165661
PCT Pub. Date: Nov. 5, 2015

(65) Prior Publication Data
US 2017/0051770 A1   Feb. 23, 2017

(30) Foreign Application Priority Data
Apr. 30, 2014 (DE) .................... 20 2014 102 037 U

(51) Int. Cl.
*F16B 7/18* (2006.01)
*F16B 7/04* (2006.01)

(52) U.S. Cl.
CPC ............ *F16B 7/187* (2013.01); *F16B 7/0453* (2013.01); *F16B 7/0466* (2013.01)

(58) Field of Classification Search
CPC ..... E04C 2003/0465; E04C 2003/0478; E04B 1/5831; E04B 1/5881; Y10T 403/4628;
(Continued)

(56) References Cited

U.S. PATENT DOCUMENTS 6,582,149 B1 *  6/2003  Holscher ................. E04B 2/766
                                                                403/240
6,712,543 B1 *  3/2004  Schmalzhofer ......... F16B 7/187
                                                                403/187

(Continued)

FOREIGN PATENT DOCUMENTS

DE          41 27 284 C1      12/1992
DE        196 41 500 A1         4/1998
(Continued)

OTHER PUBLICATIONS

International search report for application No. PCT/EP2015/056525 dated Jun. 17, 2015.

*Primary Examiner* — Jonathan P Masinick
(74) *Attorney, Agent, or Firm* — Bachman & LaPointe, PC

(57) ABSTRACT

Profile connector for connecting a first and a second profile bar (3, 4), made from a light metal alloy, with a body (5) which can be accommodated in an undercut elongated groove (34) in the second profile bar (4) and has at least one bracing leg (7) for bracing against an undercut (9, 10) of the undercut elongated groove (34) of the second profile bar (4), and an anchor bolt (13) which is accommodated in a through opening (12) that is created in the body (5) and extends at right angles to a longitudinal extension of the body (5), which anchor bolt has an anchor bolt head and fixes the profile connector (1) frontally, on the first profile bar (3), and with a first clamping screw (22) accommodated in an internal threaded opening (20) provided inside the body (5) and extending at an angle to a longitudinal center line ($L_A$) of the through opening (12), which clamping screw serves to displace the body (5) along the anchor bolt (13) away from the anchor bolt head (19) towards the first profile bar (3) by tightening the first clamping screw (22) in the internal thread of the first internal threaded opening (20), thereby bracing (Continued)

the first clamping screw (22) on the anchor bolt (13), wherein a forming geometry (29) is conformed and arranged on the body (5) for shaping frontally into the first profile bar (3) by tightening the first clamping screw (22) to create a positive locking connection between the body (5) and the first profile bar (3).

16 Claims, 2 Drawing Sheets

(58) Field of Classification Search
CPC ...... Y10T 403/46; F16B 7/044; F16B 7/0446; F16B 7/0453; F16B 7/046; F16B 7/0466; F16B 7/187
See application file for complete search history.

(56) References Cited

U.S. PATENT DOCUMENTS

| | | | | |
|---|---|---|---|---|
| 7,806,622 | B2 * | 10/2010 | Stauss | F16B 7/187 403/362 |
| 8,444,342 | B2 * | 5/2013 | Stauss | F16B 7/187 403/231 |

FOREIGN PATENT DOCUMENTS

| | | | | |
|---|---|---|---|---|
| DE | 20 2005 013 097 U1 | 12/2005 | | |
| DE | 102014018920 A1 * | 6/2016 | | F16B 7/187 |
| EP | 1141562 A1 | 10/2001 | | |
| FR | 2717870 A1 | 9/1995 | | |
| FR | 2846019 A1 * | 4/2004 | | E04F 13/0814 |

* cited by examiner

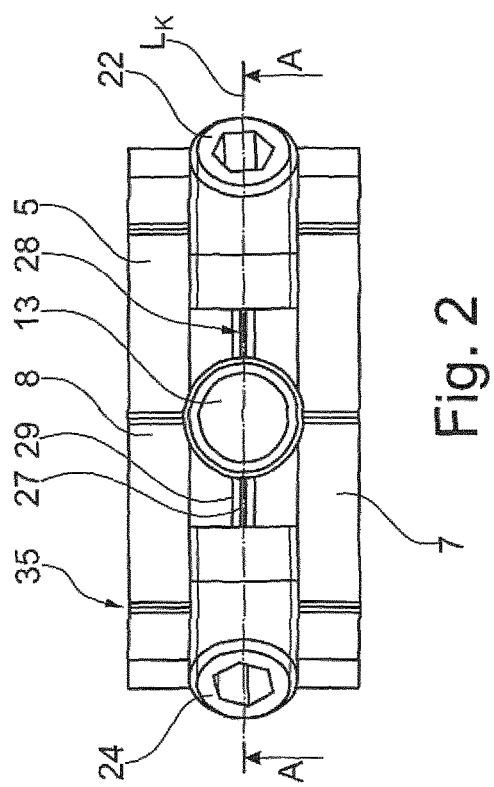
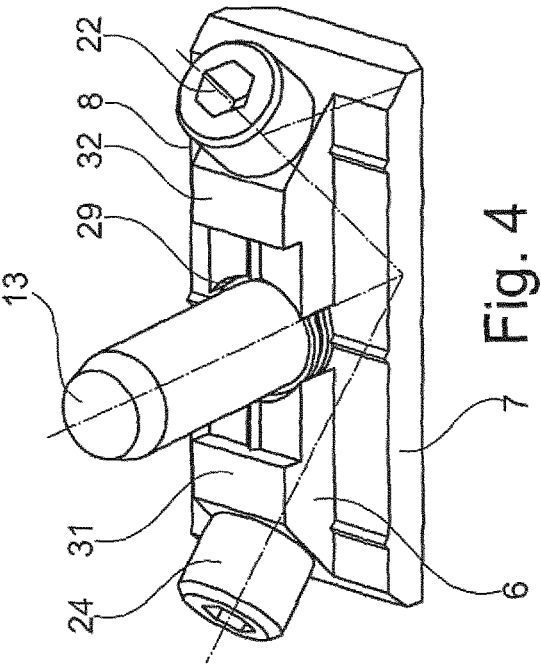
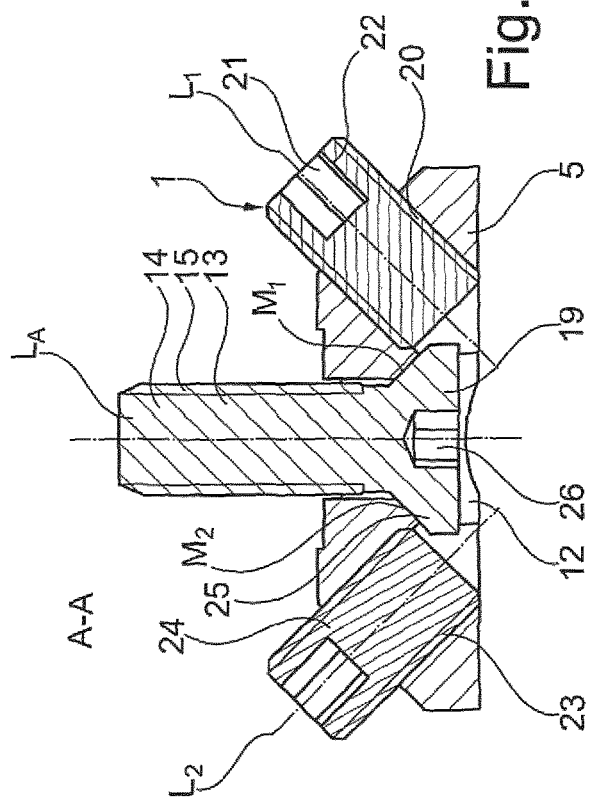

PROFILE CONNECTOR AND PROFILE ASSEMBLY

BACKGROUND OF THE INVENTION

The invention relates to a profile connector for connecting two profile bars, each of which is made in particular from a light metal alloy, and each most particularly preferably having at least one undercut elongated groove. The profile bars themselves are not part of the profile connector, but they can be attached to each other at right angles to one another with the connector. The profile connector comprises a body preferably in the form of a cold extruded part, most particularly preferably made of steel, with a side preferably consisting of a comb bar and which when fitted faces towards the first profile bar, preferably a bearing side for bearing on a first profile bar, particularly on a face side of a first profile bar, wherein the body may be accommodated in an undercut elongated groove, particularly a T-groove, of a second profile bar. The body has at least one bracing leg for bracing against an undercut in the undercut elongated groove of the second profile bar (to enable a force in the direction of the first profile bar to be applied to the second profile bar). Inside the body, a through opening is provided that preferably has no internal thread and extends perpendicularly both to a longitudinal extension of the body and to the second elongated groove of the second profile bar, and in which an anchor bolt with a screw head is seated, with which the profile connector may be fixed on the first profile bar, in particular on the frontal face thereof, still more preferably in a centric internal threaded opening. It is particularly preferable if the screw head can be countersunk completely in the body. A first inner internal threaded opening, in which a first clamping screw, preferably in the form of a grub screw is fitted, extends inside the body at a slant, that is to say at an angle to a longitudinal centre line of the through opening. This is designed and arranged to displace the body along the anchor bolt away from the screw head, towards the first profile bar, by tightening the clamping screw in the internal thread, in other words by screwing the clamping screw towards the anchor bolt and at the same time bracing the clamping screw on the anchor bolt, which to this extent serves as a thrust bearing. The clamping screw is actuated from the outside through the groove opening of the undercut elongated groove of the second profile bar. The invention further relates to a profile assembly as described herein.

DE 41 27 284 C1 describes a profile connector for connecting two aluminium profile bars. The known profile connector comprises a body with two openings, a through opening for accommodating an anchor bolt for anchoring the profile connector in a first profile bar, and an internal threaded opening extending at an angle thereto, in which a grub screw can be screwed in the direction of the anchor bolt to apply load to and so displace the body, and therewith also a second profile bar that accommodates the body in an undercut elongated groove, towards the first profile bar. In the known profile connector, this pressing force is not applied evenly over the full area of the undercut elongated groove of the second profile connector, but rather along a bearing line, since the tightening of the clamp screw causes the body to be tilted relative to the anchor bolt. In order to ensure that the second profile bar can be pressed against the body which is held in place on the first profile bar, the anchor bolt of the known profile connector must not be tightened until it is immovable, because otherwise the undercuts of the undercut elongated groove of the second profile connector cannot be pushed between the bracing leg of the body and the face side of the first profile bar. In practice, if an anchor bolt is tightened too far, it is often necessary to loosen it before the second profile body is slid onto the body.

This problem is also the reason why there is no defined bearing or bracing area for the first clamping screw on the anchor bolt. It is also disadvantageous that, despite the non-positive connection between the first and second profile bars, it is still or remains possible for the profile bars to twist about the longitudinal centre line of the anchor bolt.

An alternative profile connector including two clamping screws as well as an anchor bolt is described in EP 1 141 562 B1, but in this case the clamping screws are aligned parallel to the anchor bolt and are braced on the body, not on the anchor bolt. The internal threaded openings for accommodating the clamping screws are not provided on the body, but in clamping shoes that that are separate from the body. This disadvantage of the known profile connector is the fact that it consists of many separate parts. Moreover, a problem this known profile connector is that the anchor bolt cannot be tightened until it is immovable, to enable the second profile bar to be pushed on.

A profile connector with a flat bracing surface is known from DE 196 41 500 A1. In this case too, a defined preassembly is not possible.

EP 1 141 562 B1 describes a profile connector with two clamping screws arranged parallel to and at a distance from the anchor bolt, wherein the known profile connector can be braced on a profile bar with flat bracing surfaces. Defined preassembly is not possible.

Document EP 2 717 870 A1 describes a profile connector comprising two clamping screws arranged biangularly, preferably perpendicularly to one another, wherein said clamping screws are braced against the anchor bolt. A defined pre-assembly of the profile connector frontally on a profile bar is not possible.

SUMMARY OF THE INVENTION

Against the background of the state of the art as described in the preceding text, the object underlying the invention is to describe an alternative profile connector for connecting two profile bars to each other, particularly bars made from a light metal alloy. It should preferably be easily possible to fit the profile connector on a first profile bar beforehand, particularly on the front face thereof. In addition or alternatively thereto, the profile connector should be designed such that in the fixed state it is possible to reliably prevent the profile bars attached to each other from twisting relative to one another about the longitudinal centre line of the anchor bolt. In addition or alternatively thereto, the profile connector should consist of the smallest possible number of parts and bear over a large expanse on the at least one undercut of the undercut elongated groove of the second profile bar, thereby also enabling a force to be applied over a large area to the second profile bar in the direction of the first profile bar. In addition or alternatively thereto, the profile connector should be designed such that the transmission of force from the at least one clamping screw to the anchor bolt is optimised, and in particular a defined clamping situation and bearing situation on the anchor bolt is assured. Moreover, the object consists in describing a profile assembly that is manufactured or manufacturable with a profile bar that has been constructed according to the concept of the invention, and which in addition to the profile connector is also furnished with two profile bars arranged at right angles to each other, and made from a light metal alloy, wherein at least the second profile bar has at least one undercut elongated groove. Preferably, both profile bars have at least one, preferably multiple undercut elongated grooves.

This object is solved with a profile connector having the features described herein, and with a profile assembly having the features described herein. Advantageous refinements of the invention are described in the subordinate claims. The scope of the invention extends to all combinations of at least tow of the features disclosed in the description, the claims and/or the figures.

The invention is based on the underlying idea of providing a forming geometry to the side of the body that faces the profile connector when the profile connector is in the assembled state, preferably to a bearing surface of the body for frontal bearing on the first profile bar, which geometry is designed and arranged such that the displacement of the body towards the first profile connector, particularly towards a face side of the first profile connector (brought about by tightening the clamping screw), causes said geometry to mould with the profile connector material of the profile connector, that is to say to produce a form-congruent recess in the first profile bar, so that a positive locking fit is created thereby between the body and the first profile bar. During forming, material of the first profile bar is reshaped by the pressure applied to the material of the first profile bar because of the forming geometry, so as to produce a recess to accommodate the forming geometry in the face side of the first profile bar. In a profile assembly that has been produced with profile connectors according to the concept of the invention, this positive locking fit prevents the profile bars from twisting relative to each other about the longitudinal centre line of the anchor bolt. In addition, an electrically conductive connection may be produced between the body and the first profile bar via the forming geometry. It is most particularly preferable if the profile connector in a profile assembly that has been produced with a profile connector according to the invention is made from a harder material, particularly steel, than the material used to produce the first profile bar, which is preferably made from a light metal alloy, particularly an aluminium alloy. Most particularly preferably, the forming geometry tapers towards the first profile bar. Also preferably, the forming geometry has a smaller width dimension than a comb bar that is preferably provided to support the forming geometry of the body with preferably T-shaped cross-section, or than an outer diameter of an anchor bolt shaft.

As will be explained later with regard to the profile assembly according to the invention, the forming geometry makes it possible for the first time to preassemble the profile connector for producing a profile assembly in a defined way, for which purpose the profile connector, particularly the body thereof, is dimensioned such that the anchor bolt can be tightened until the body of the profile connector with its forming geometry lies flush against the face side of the first profile bar, i.e., is braced there (still without having been formed into the face side of the first profile bar), and in this state the gap or distance between the at least one bracing leg and the face side of the first profile connector is larger, in particular larger by a clearance dimension, than the thickness or height extension of the at least one undercut of the undercut elongated groove of the second profile bar measured in the same direction, thus making it possible in this respect, when the profile connector is in the preassembled state with the anchor bolt tightened, for the second profile bar to be pushed onto the preassembled profile connector, more precisely onto the body thereof, so that the second profile bar can then be shifted farther towards the first face side of the first profile bar by tightening the at least one clamping screw at the desired shifted position (with the forming geometry into the material of the first profile bar), in order to fix the profile bars to one another (permanently and in torsion-proof manner) and at the same time shape the forming geometry of the body of the first profile connector into the material of the first profile bar. Expressed another way, it is provided in a refinement of the invention that an overall height extension of the body aligned parallel to the lengthwise extension of the anchor bolt is chosen with the forming geometry such that when the body of the profile connector is seated in the undercut elongated groove of the second profile bar the second profile bar is displaceable relative to the body and to the first profile bar along the lengthwise extension of the undercut elongated groove of the second profile bar. In the preassembled state, the body of the first profile bar is reliably prevented from twisting by the frictionally engaged contact on the face side of the first profile bar.

As was stated earlier, it is particularly favourable if the forming geometry includes at least one forming geometry section that tapers away from the body (towards the first profile bar). This is preferably wedge-shaped at least in sections thereof. It is particularly favourable if the forming geometry is elongated, in particular having the shape of an elongated wedge, wherein the elongated forming geometry may extend in the direction of the longitudinal extension of the body, i.e. in the direction of the longitudinal extension of the undercut elongated groove of the second profile bar, or also perpendicularly thereto. The forming geometry does not necessarily have to be wedge-shaped. If the shape is correspondingly thin or has low width, the geometry does not have to taper towards the first profile bar in order to assure a forming effect.

An embodiment in which the forming geometry does not have only a single forming section, but rather at least or exactly two forming sections, preferably spread over the two lengthwise sides of the body that are set apart by the through opening for the anchor bolt so that a positive locking fit may be created between the body and the first profile bar on two opposite sides of the anchor bolt is particularly preferred.

It has been found to be particularly advantageous if the profile connector is furnished on at least one end with a countersunk section, which may protrude into an undercut elongated groove in the first profile bar when the profile connector is in the assembled state, thus serving as a further anti-torsion means. At least one forming section of the forming geometry is located preferably between the countersunk section and the though opening in the direction of the longitudinal extension of the profile connector.

It has been found to be particularly advantageous, particularly for an embodiment of the profile connector in which the anchor bolt head may be countersunk at least partly, preferably completely within the body preferably in a widened end section of a through opening, if the first internal threaded opening (and preferably also an optional, second internal threaded opening, which will be explained later in this document), which is/are inclined with respect to the through opening extend(s) at an angle thereto open(s) into the through opening, so that the clamping screw in the threaded opening may be braced on the anchor belt inside the body. In this way, a particularly rugged profile connector is obtained which is optimised for the installation space and can also be assembled relatively easily.

In a refinement of the invention, it is advantageously provided that the profile connector has not only a single internal threaded opening extending at an angle to the through opening, but two such internal threaded openings, so that besides the first clamping screw a second clamping screw is also adjustable towards the anchor bolt, particularly towards the anchor bolt head. In this context, the internal threaded openings are arranged such that the clamping screw arranged therein can be operated and/or tightened through the groove opening in the undercut elongated groove of the second profile bar. Such an embodiment has the advantage that it is possible to prevent the body from being canted relative to the anchor bolt by tightening the two clamping screws evenly against the anchor bolt, and thereby obtaining the effect of flat bearing of the profile connector body, particularly of the at least one bracing leg, preferably of two bracing legs on the at least one, preferably on two parallel undercuts of the undercut elongated groove of the second profile bar. In this way, it is possible to reliably prevent the canting that occurs with the profile connector known from DE 41 27 284 C1. Unlike the profile connector known from EP 1 141 562 B1, a profile connector constructed according to the concept of the invention requires far fewer parts to perform its function, it is of simpler design, and particularly robust due to the bracing of both clamping screws on the anchor bolt, preferably in an area inside the body.

It is particularly practical if the internal threaded openings are arranged onto opposite sides of the through opening in the direction of the longitudinal extension of the body and/or the undercut elongated groove of the second profile bar. In such case, it is further preferable if the longitudinal centre lines of the two clamping screws and the longitudinal centre line of the anchor bolt are arranged in a common plane.

It has proven to be particularly advantageous if the longitudinal centre line of the first clamping screw and the longitudinal centre line of the second clamping screw form the same angle in terms of amount with the longitudinal centre line of the anchor bolt, in particular at least approximately 45°.

In a refinement of the invention, it is advantageously provided that the anchor bolt has a (defined) inclined bracing surface for bearing on and bracing against the first (and a second if provided) clamping screw, wherein in this context inclined means that the bracing surface is at an angle not equal to 90° with respect to the longitudinal centre line of the anchor bolt and at an angle not equal to 90° with respect to a radial plane of the anchor bolt, which extends perpendicularly to the longitudinal centre line of the anchor bolt. The bracing surface is preferably arranged at an angle between 20° and 70°, preferably between 30° and 60°, more preferably between 40° and 50°, and most particularly preferably at least approximately 45° relative to the longitudinal centre line of the anchor bolt. With the provision of a defined inclined bracing surface for the at least one clamping screw, the bracing situation, and the magnitude of the axial force component generated for displacing the body along the anchor bolt is not arbitrary as is the case in the related art, but defined, which is particularly advantageous for an embodiment according to which the at least one internal threaded opening for the at least one clamping screw opens into the through opening for the anchor bolt inside the body, so that the clamping screw may be braced inside the body on the anchor bolt, particularly on the anchor bolt head.

It has proven particularly advantageous for producing such an inclined bracing surface if the screw head of the anchor bolt is constructed preferably as a countersunk head which can be sunk into the body, wherein in this case the bracing surface is preferably formed by a conical surface of the countersunk head which tapers towards the front end of the screw.

It has proven particularly practical if the longitudinal centre line of the first clamping screw, and if provided a longitudinal centre line of a second clamping screw, extend(s) at right angles to an axis extending in the bracing surface (and continuing beyond it), i.e. which not only touches and intersects said surface, in particular of a surface line of a conical bracing surface extending at a cone angle to the longitudinal centre line of the anchor bolt. In such, it is still more preferable if a face side of the first clamping screw, and if provided a face side of the second clamping screw as well are flat, i.e., extend in a radial plane with the respective longitudinal centre line of the clamping screw, to provide the largest possible bearing surface for bracing against the bracing surface of the anchor bolt. This configuration does not necessarily mean that the full expanse of face side of the first—and if provided the second—clamping screw(s) must lie flush against the bracing surface, or that the longitudinal centre line(s) of the one or more clamping screws meet the bracing surface. The essential point is first that the one or more longitudinal centre lines of the one or more clamping screws form(s) an angle of 90° with the axis that extends in the bracing surface and notionally extends beyond said bracing surface, wherein the intersection point between the one or more longitudinal centre lines and the respective axis of the bracing surface may also lie outside the bracing surface, particularly if the clamping screw is only braced against the bracing surface with a peripheral section of the face side.

It has proven particularly practical if the longitudinal centre line of the first clamping screw and/or the longitudinal centre line of an optional second clamping screw and/or the longitudinal centre line of the associated internal threaded openings form(s) an angle with the longitudinal centre line of the anchor bolt from an angular range between 20° and 70°, preferably between 30° and 60°, more preferably between 40° and 50°, most particularly preferably (at least approximately) 45°. A flat face side of the one or both clamping screw(s), forming the basis for the bracing surface preferably extends parallel to an axis that extends within the bracing surface.

One embodiment of the profile connector has proven to be particularly advantageous, in which a leg forming geometry particularly (but not necessarily) in a wedge shape is provided on the at least one bracing leg on a side facing the undercuts of the undercut elongated groove of the second profile bar, for shaping into the undercuts of the undercut elongated groove of the second profile bar and thereby creating a positive locking fit by tightening of the at least one clamping screw. In this way, an external electrically non-conductive layer that may be provided on the second profile bar may be perforated, so creating an electrically conductive connection between the body and the second profile bar. Most particularly preferably, the forming geometry provided according to the invention is provided for this purpose on the bearing side of the body for forming into the first profile bar, since this enables an electrically conductive connection to be produced between the profile bars via the body. For the purposes of the specific configuration of the leg forming geometry, there are a number of different options. Preferably, several line-shaped forming geometries, in particular wedge geometries, which are tapered towards the undercuts of the undercut elongated groove of the second profile bar are provided, in order to make forming easy, by tightening the clamping screws.

Particularly preferred is an embodiment of the body in which the body has two lateral bracing legs, each designed to bear on one of two parallel undercuts of the undercut elongated groove, preferably a T-groove, of the second profile bar, wherein the bracing legs are surpassed in the direction of the first profile bar by a comb bar that forms the side facing the first profile bar. Such a configuration results in a construction of the body in the shape of a "T" when viewed in cross section, wherein the comb bar protrudes into the region between the parallel undercuts of the undercut elongated grooves towards the first profile bar, and preferably continues on both sides of the through opening. The comb bar preferably forms a bearing surface for bracing on the face side of the profile bar, particularly with forming geometry that is formed into the first profile bar.

The forming geometry is most particularly preferably arranged on a comb bar as described previously, which extends beyond the at least one bracing leg in the direction of the first profile bar and which faces towards the first profile bar when installed correctly.

It is most particularly favourable if the two bracing legs of the body "T" shape are chamfered on a(n) (under)-side of the body which is facing away from the first profile bar and from the base of the undercut elongated groove of the second profile bar, particularly so that they may be adapted to some degree to an at least approximately shape-congruent groove configuration.

In a refinement of the invention, it is advantageously provided that the body has two lateral bracing legs, each designed to bear on an undercut of the undercut elongated groove of the second profile bar, and that the bracing legs are surpassed by a comb bar which forms the bearing surface for bearing on the first profile bar.

In a refinement of the invention, it is advantageously provided that the body is conformed with a T-shaped cross section, wherein the bracing legs of the T-shape are preferably chamfered.

In a refinement of the invention, it is advantageously provided that the through opening and the first and/or a second internal threaded opening are provided in a comb bar that extends beyond the bracing legs.

The invention also relates to a profile assembly with a profile connector produced according to the concept of the invention. Besides the profile connector, the profile assembly also includes the two profile bars arranged at right angles to each other, made in particular from a light metal alloy, preferably an aluminium alloy, wherein the profile connector is fixed to the first profile bar by means of the anchor bolt, particular by screwing the anchor bolt into a central internal threaded opening in the first profile bar, wherein the internal thread may be prepared, that is to say it may be provided before the anchor bolt is screwed in, or alternatively the anchor bolt may be constructed as a thread-forming, particularly self-tapping screw. Alternatively, it is possible to fix the anchor bolt with its thread in a threaded sleeve, which is then fixable or fixed in a preferably provided undercut elongated groove of the first profile bar. In a preassembled profile assembly, the body of the profile connector is then seated in an undercut elongated groove of the second profile bar, and is braced with one bracing leg against an undercut of the undercut elongated groove in order to apply a force to the second profile bar in the direction of the first profile bar along the longitudinal extension of the anchor bolt, by tightening, i.e. turning the first clamping screw tighter, and preferably an optional second clamping screw as well, against the anchor bolt, preferably against an inclined bracing surface of the anchor bolt, inside the associated internal threaded opening.

In the assembled and tightened state, the body of the profile connector creates a positive locking fit with the first profile bar, preferably by virtue of its forming geometry, as the forming geometry of the profile connector is shaped into the material of the first profile bar, particularly on the front side. This preferably also gives rise to a torsion-proof connection, which reliably prevents the profile bars from twisting about the longitudinal centre line of the anchor bolt. Most particularly preferably, the formed geometry is moulded into a peripheral wall or a section of a peripheral wall of the first profile bar, which surrounds a centric internal threaded opening for receiving the anchor bolt.

In order to ensure that for the first time the profile connector can be preassembled in defined manner to produce a profile assembly, in a refinement of the invention it is provided that the profile connector, particularly the body, is dimensioned such that the anchor bolt may be tightened until the body of the profile connector is braced with its forming geometry on the face side of the first profile connector, and in this condition the gap or distance between the at least one bracing leg and the face side of the first profile connector larger (particularly larger by a clearance dimension) than the thickness or height extension of the at least one undercut of the undercut elongated groove (measured in the direction of the depth extension of the elongated groove) of the second profile bar, thus making it possible in this respect, when the profile connector is in the preassembled state as described previously with the anchor bolt tightened, for the second profile bar to be pushed onto the preassembled profile connector, more precisely onto the body thereof, so that the second profile bar can then be shifted farther towards the first face side of the first profile bar by tightening the at least one clamping screw at the desired shifted position (with the forming geometry into the material of the first profile bar), in order to fix the profile bars to one another and at the same time shape the forming geometry of the body of the first profile connector into the material of the first profile bar. In other words, in a refinement of the invention it is provided that in order to enable the profile connector to be preassembled it is provided that an overall height extension of the body aligned parallel to the lengthwise extension of the anchor bolt (preferably with anchor bolt shaft already countersunk therein) is chosen with the forming geometry such that when the body of the profile connector is seated in the undercut elongated groove of the second profile bar the second profile bar is displaceable relative to the body and to the first profile bar along the lengthwise extension of the undercut elongated groove. In this state, the forming geometry has preferably not begun to form into the material of the first profile connector, or at least is not yet fully formed.

Most particularly preferably, in order to ensure that the profile connector can be readily preassembled on the first profile bar, a total height extension of the body (with the anchor bolt head already seated therein) aligned parallel to the longitudinal extension of the anchor bolt is larger, in particular larger by an assembly clearance, than the distance measured parallel to the anchor bolt of the longitudinal extension between an external elongated groove opening of the undercut elongated groove of the second profile bar and the base of said elongated groove.

In this context, it has proven particularly advantageous if a total height extension of a body preferably having a T-shaped cross section and the forming geometry aligned parallel to the longitudinal extension of the anchor bolt and a comb bar (preferably perforated in the middle by the through opening and/or continuing on both sides of the through opening) extending beyond the bracing leg of the body in the direction of the first profile bar is larger than a height extension of the undercuts of the undercut elongated groove of the second profile bar measured in the same direction.

According to a particularly preferred embodiment, as was described in the introduction, the profile connector has a countersunk section for frontal countersinking in an undercut elongated groove of the first profile bar. Most particularly preferably, two countersunk sections are provided at a distance from each other along the longitudinal extension of the profile connector. The at least one countersunk section in a completed profile assembly is preferably accommodated in an undercut elongated groove of the first profile bar, thereby ensuring additional torsion-proofing.

In the event that the profile connector to be used for the profile assembly has an inclined bracing surface, particularly a cone surface, and more preferably said surface is on the anchor bolt head, for the purposes of an advantageous configuration of the profile assembly it is preferred if the first clamping screw, and a second clamping screw if provided, is/are braced on its/their preferably flat frontal face(s) against the inclined bracing surface of the anchor bolt, most particularly preferably inside the body of the profile connectors, which also more preferably accommodates the anchor bolt head, at least a section thereof, preferably entirely, inside itself, in particular in a widened section of the through opening.

Particularly for an embodiment of the profile assembly with a profile connector that consists of two clamping screws, it is advantageous is both clamping screws are tightened in such manner that the body of the profile assembly, when viewed in the direction of the longitudinal extension of the body is braced on both sides (lengthwise sides) of the anchor bolt against the face side of the first profile bar and bears thereon. Moreover, it is most particularly preferable of the at least one bracing leg of the body bears in planar manner, i.e. not linearly, on the undercuts of the undercut elongated groove of the second profile bar.

Particularly preferred is an embodiment of the profile assembly in which when the first clamping screw and the second clamping screw (if two clamp screws are present) is/are tightened a longitudinal centre line of the body is positioned orthogonally to the longitudinal centre line of the first profile bar and extends parallel to a longitudinal extension or lengthwise axis of the undercut elongated groove of the second profile bar, in which the body is seated.

In a refinement of the invention, it is advantageously provided that the forming geometry is introduced frontally in positive locking manner into a central peripheral wall of the first profile bar surrounding an interior threaded opening.

In a refinement of the invention, it is advantageously provided that a total height extension of the body with the forming geometry aligned parallel to the lengthwise extension of the anchor bolt is selected such that when the body of the profile connector is seated in the undercut elongated groove and preferably bearing frontally with the forming geometry against the profile bar the second profile bar is displaceable along the lengthwise extension of the undercut elongated groove relative to the body and to the first profile bar.

In a refinement of the invention, it is advantageously provided that a total height extension of the body with the forming geometry aligned parallel to the lengthwise extension of the anchor bolt is larger than the distance—measured parallel to the lengthwise extension of the anchor bolt— between an external elongated groove opening of the undercut elongated groove of the second profile bar and the base of said elongated groove.

In a refinement of the invention, it is advantageously provided that a total height extension of a body preferably having a T-shaped cross section and the forming geometry aligned parallel to the longitudinal extension of the anchor bolt and a comb bar extending beyond the bracing leg in the direction of the first profile bar is larger than a height extension of the undercuts of the undercut elongated groove of the second profile bar measured in the same direction.

In a refinement of the invention, it is advantageously provided that a countersunk section separated by the forming geometry from the through opening in the direction of the lengthwise extension of the body is accommodated in an undercut elongated groove in the first profile bar when a second profile bar is pressed frontally against the first profile bar.

In a refinement of the invention, it is advantageously provided that the first clamping screw and/or a second clamping screw is/are braced on an inclined bracing surface of the anchor bolt, particularly on a conical surface of the anchor bolt head.

In a refinement of the invention, it is advantageously provided that the body bears particularly frontally on the first profile bar on both sides of the anchor bolt viewed in the direction of the lengthwise extension of the body.

In a refinement of the invention, it is advantageously provided that a longitudinal centre line of the body is arranged orthogonally to the longitudinal centre line of the first profile bar when the first and second clamping screws are tightened.

Further advantages, features and particularities of the invention will become apparent from the following description of preferred embodiments with reference to the drawing.

BRIEF DESCRIPTION OF THE DRAWINGS

In the drawing:

FIG. 1: shows a lengthwise cross section through the representation of a profile connector according to FIG. 2, FIG. 2: is a plan view of the profile connector of FIG. 1, FIG. 3: is a view of a profile connector produced according to the concept of the invention in the direction of its lengthwise extension (accurate projection of the representation of FIG. 2), FIG. 4: is a perspective view of a profile connector constructed according to the concept of the invention.

In the figures, identical elements and elements with the same function are identified with the same reference signs.

DETAILED DESCRIPTION

Figure 5:
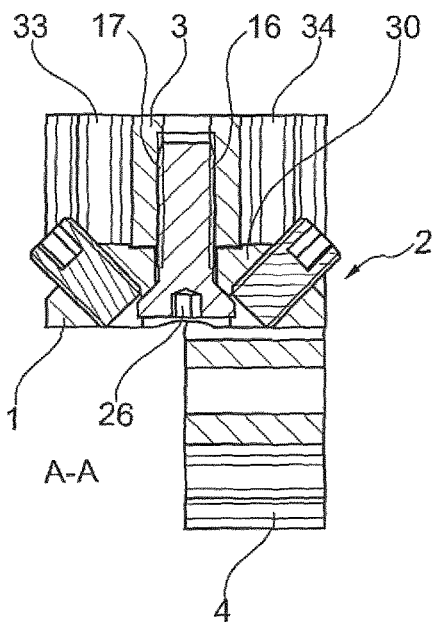
FIG. 5 to FIG. 8: various partially cut away illustrations of a profile assembly produced with a profile connector constructed according to the concept of the invention, wherein a second profile bar, which will be explained subsequently, is seated in the undercut elongated groove of the second profile bar but, contrary to a usual arrangement, it is not fully seated, which would be/is preferred, to better illustrate the invention.
Figure 6:
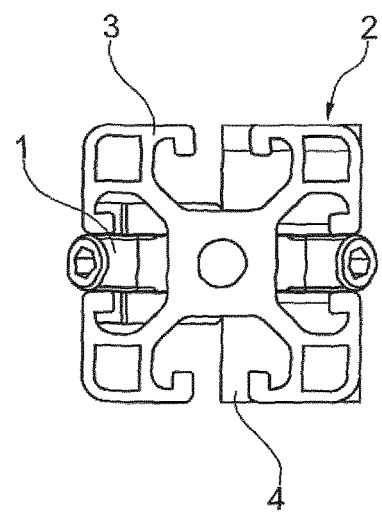
Figure 7:
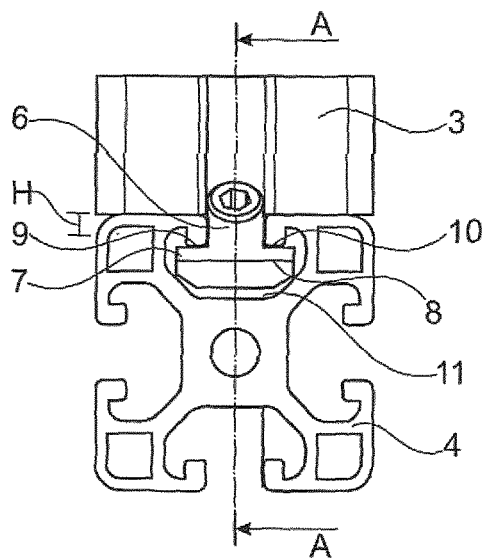
Figure 8:
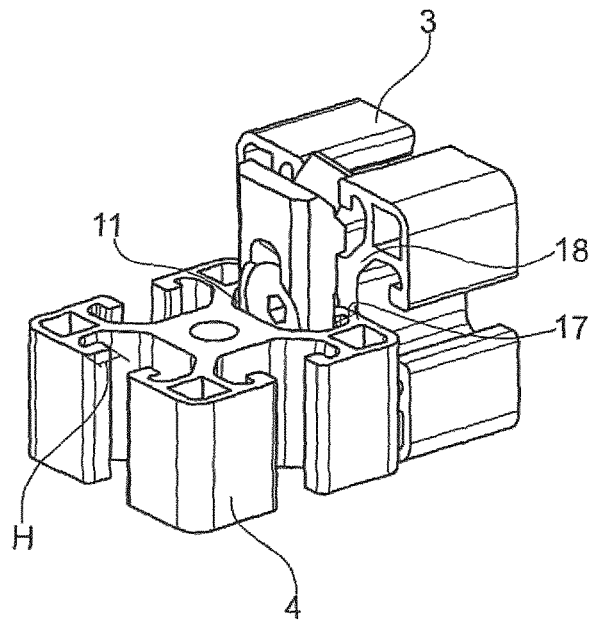

As is made evident by FIGS. 5 to 8, the profile connector of FIGS. 1 to 4 is used to produce a profile assembly 2 which besides profile connector 1 also comprises a first profile rod 3 and a second profile rod 4 aligned orthogonally thereto.

From FIGS. 1 to 4, it may be seen that profile connector 1 comprises a body 5 as a cold extruded part made from steel, which in the cross sectional view of FIG. 3 is in the shape of a "T". Body 5 is equipped with an elevated comb bar 6 (in the direction of the first profile bar), which surpasses the two lateral bracing legs 7, 8, each of which is braced against the underside of an undercut 9, 10 of an undercut elongated groove 11 in second profile bar 4 in a profile assembly, in this way tightening second profile bar 4 towards first profile bar 3 and applying a tensile force thereto.

A through opening 12 is provided in body 5, or more precisely in the comb bar 6 that extends beyond bracing legs 7, 8, in this case preferably in the centre or middle thereof, and serves as seating for an anchor bolt 13 in the form of a countersunk screw with a shaft 14 which is furnished with an external thread 15 which can be screwed together with internal thread 16 of a centric internal thread opening 17 (in this case an uninterrupted channel) in face side 18 of first profile bar 3 and is screwed together in a profile assembly.

Through opening 12 has a stepped design to prevent an anchor bolt 13 with an anchor bolt head 19 from slipping.

In addition, two internal thread openings are formed to the side of and extending or passing at an angle to the longitudinal extension of anchor bolt 13 in comb bar 6, each of which accommodates a clamping screw. For specific purposes, this is a first internal thread opening 20 accommodating a first clamping screw 22 in the form of a grub screw and having a frontal drive face 21.

On the side that is separated by means of anchor bolt 13 there is a second internal thread opening 23 with a second clamping screw 24, also in the form of a grub screw. FIG. 1 shows that the longitudinal centre lines of first and second clamping screws $L_1$, $L_2$ each extend at an angle of about 45° to a longitudinal centre line $L_A$ of anchor bolt 13. All of the longitudinal centre linen $L_1$, $L_2$, $L_A$ are in a common plane, which also accommodates a longitudinal centre line $L_K$ of body 5 shown in FIG. 2.

In order to shift body 5 together with the second profile bar 4 away from the anchor bolt head 19 and towards first profile bar 3, at least one of the clamping screws 22, 24, preferably both clamping screws 22, 24 are tightened, that is to say screwed farther into body 5, against a bracing surface 25, here in the form of a conical surface, of anchor bolt 13, which in the embodiment shown is formed by anchor bolt head 19 with a countersunk head. It should be noted that a surface line $M_1$ of bracing surface 25 is orientated orthogonally to longitudinal centre line $L_1$ of first clamping screw 22, and a further surface line $M_2$ is orientated perpendicularly to longitudinal centre line $L_2$ of second clamping screw 24. Thus, the flat face sides of the clamping screws 22, 24 extend parallel to the respectively associated surface lines.

The first and second internal thread openings 20, 23 also open into the stepped through opening 12 inside body 5, so that the clamping screws 22, 24 may be braced on the conical bracing surface of anchor bolt 13 inside body 5.

FIG. 1 shows that the side of anchor bolt 13 facing away from first profile bar 3 has an anchor bolt drive face 26, which is used for preassembling profile connector 1 with first profile bar 3.

To this end, anchor bolt 13 is tightened via drive face 26 until, as illustrated for this embodiment, a forming geometry 29 consisting of two forming geometry sections 27, 28, which are substantially linear and tapered in a wedge-like arrangement towards the first profile bar 3 is braced against face side 18 of first profile bar 3, more precisely against a peripheral wall 30 that surrounds centric internal thread opening 17.

The height extension of comb bar 6, that is to say of the body section that extends beyond bracing legs 7, 8 including the height extension of forming geometry 29 is dimensioned such that in this preassembled condition the second profile bar 4 can be slid over body 5 in the direction of the longitudinal extension of undercut elongated groove 11. In other words, the height extension of comb bar 6 including forming geometry 29 is (slightly) greater than the height extension H of the undercuts of the undercut elongated groove 11 which accommodates body 5.

In order to finally fix the two profile bars 3, 4 to each other, clamping screws 22, 24 are tightened further, so that the forming geometry 29 is formed further into the material of first profile bar 3, more precisely into peripheral wall 30, with the result that a torsion-proof connection is created at the same time.

The figures also show that in addition to the forming geometry 29 two countersunk section 31, 32 separated by anchor bolt 13 are provided, forming the end sections of comb bar 6, and which engage in respective undercut elongated grooves 33, 34 in first profile bar on two opposing sides of centric internal thread opening 17 when the profile assembly is fixed, thereby providing additional rotation protection.

As was indicated in the introduction, an embodiment of profile connector 1 having only one internal thread opening 20 and/or only one clamping screw 22 can also be produced. However, the provision of the two clamping screws 22, 24 enables bracing legs 7, 8 to bear flat on undercuts 9, 10 of the undercut elongated groove 11.

FIGS. 2 and 3 show that a leg bracing geometry 35, in this case in the form of multiple wedge-shaped sections, is provided on bracing legs 7, 8 on the side facing undercuts 9, 10 and/or the bracing surfaces 25 of undercut 9, 10, which are shaped into the material of the second profile bar 4 when clamping screws 22, 24 are tightened, thereby creating an electrically conductive connection between body 5 and second profile bar 4. If the forming geometry 29 is already provided, as is preferred, an electrically conductive connection may be created between the profile bars 3, 4 by combining it with the leg forming geometry 35.

As may be seen in FIG. 2, the elongated forming geometry sections 27, 28 extend in the direction of the longitudinal extension of body 5. An alternative arrangement perpendicular to this is also possible as an alternative (or additionally).

The invention claimed is:

1. Profile connector for connecting a first and a second profile bar (3, 4), made from a light metal alloy, with a body (5) which can be accommodated in an undercut elongated groove (34) in the second profile bar (4) and has at least one bracing leg (7) for bracing against an undercut (9, 10) of the undercut elongated groove (34) of the second profile bar (4), and an anchor bolt (13) which is accommodated in a through opening (12) that is created in the body (5) and extends at right angles to a longitudinal extension of the body (5), which anchor bolt has an anchor bolt head and fixes the profile connector (1) frontally, on the first profile bar (3), and with a first clamping screw (22) accommodated in an internal threaded opening (20) provided inside the body (5) and extending at an angle to a longitudinal center line ($L_A$) of the through opening (12), which clamping screw serves to displace the body (5) along the anchor bolt (13) away from the anchor bolt head (19) towards the first profile bar (3) by tightening the first clamping screw (22) in the internal thread of the first internal threaded opening (20), thereby bracing the first clamping screw (22) on the anchor bolt (13), wherein a forming geometry (29) is conformed and arranged on the body (5) for shaping frontally into the first profile bar (3) by tightening the first clamping screw (22) to create a positive locking connection between the body (5) and the first profile bar (3).

2. Profile connector according to claim 1, wherein the forming geometry (29) is shaped as a wedge that tapers in the direction away from the body (5).

3. Profile connector according to claim 1, wherein the forming geometry (29) is elongated and/or extends parallel to the longitudinal extension of the body (5) or perpendicularly thereto.

4. Profile connector according to claim 1, wherein the forming geometry (29) has two forming geometry sections (27, 28) which are separated in the direction of the longitudinal extension of the body (5) by the through opening (12).

5. Profile connector according to claim 1, wherein a countersunk section (31, 32) of the body (5) is separated from the through opening (12) in the direction of the longitudinal extension of the body (5) by the forming geometry (29), which countersunk section can be sunk in a face side of an undercut elongated groove (33) of the first profile bar (3) by tightening the clamping screw (22, 24).

6. Profile connector according to claim 1, wherein besides the first clamping screw (22) a second clamping screw (24) is provided and accommodated in a second internal threaded opening (23) created in the body (5) and extending at an angle to the longitudinal center line ($L_A$) of the through opening (12) inside the body (5), which clamping screw serves to displace the body (5) along the anchor bolt (13) away from the bolt head towards the first profile bar (3) by tightening the second clamping screw (24) in the internal thread of the second internal threaded opening (23), thereby bracing the second clamping screw (24) on the anchor bolt (13).

7. Profile connector according to claim 1, wherein in the bolt head thereof, the anchor bolt (13) has an inclined bracing surface (25) that is orientated at an angle not equal to 90° with respect to the longitudinal center line ($L_A$) of the anchor bolt (13) and orientated at an angle not equal to 90° with respect to a radial plane extending at right angles to the longitudinal center line ($L_A$) of the anchor bolt (13), on which the clamping screw can bear (22).

8. Profile connector according to claim 1, wherein the first internal thread opening (20) and/or a second internal thread opening (23) opens into the through opening (12).

9. Profile connector according to claim 1, wherein the longitudinal center lines ($L_1$, $L_2$) of the clamping screws (22, 24) and the longitudinal center line ($L_A$) of the anchor bolt (13) are arranged in a common plane.

10. Profile connector according to claim 1, wherein the longitudinal center line ($L_1$) of the first clamping screw (22) and the longitudinal center line ($L_2$) of the second clamping screw (24) form angles respectively with the longitudinal center line ($L_A$) of the anchor bolt (13) that are identical in terms of quantity.

11. Profile connector according to claim 1, wherein the anchor bolt head (19) of the anchor bolt (13) is in the form of a countersunk head with a conical surface tapering towards a leading anchor bolt end as a bearing surface (25).

12. Profile connector according to claim 1, wherein the longitudinal center line ($L_1$) of the first clamping screw (22) and/or the longitudinal center line ($L_2$) of a second clamping screw (24) is arranged orthogonally with an axis extending in the bracing surface (25).

13. Profile connector according to claim 12, wherein the axis is a surface line ($M_1$ and/or $M_2$) extending at a conical angle to the longitudinal center line ($L_A$) of the anchor bolt (13).

14. Profile connector according to claim 1, wherein a leg forming geometry (35) is conformed onto the bracing leg (7, 8) for forming into the undercut (9, 10) of the undercut elongated groove (11) of the second profile bar (4) by tightening the first and/or a second clamping screw (22, 24).

15. Profile assembly (2) comprising a profile connector (1) according to claim 1, and a first profile bar (3), and a second profile bar (4) arranged perpendicularly to the first profile bar (3) and having an undercut elongated groove (34), wherein the profile connector (1) is fixed by its anchor bolt (13) frontally on the first profile bar (3), in a central interior threaded opening (17), and a lengthwise side of the second profile bar (4), is and/or can be placed under tension by tightening the at least one clamping screw (22) against the first profile bar (3).

16. Profile assembly according to claim 15, wherein the forming geometry (2) of the profile connector (1) is formed frontally into the material, of the first profile bar (3), and in this way the body (5) of the profile connector (1) is connected in positive locking, torsion-proof manner to the first profile bar (3).

* * * * *